Patented June 12, 1951

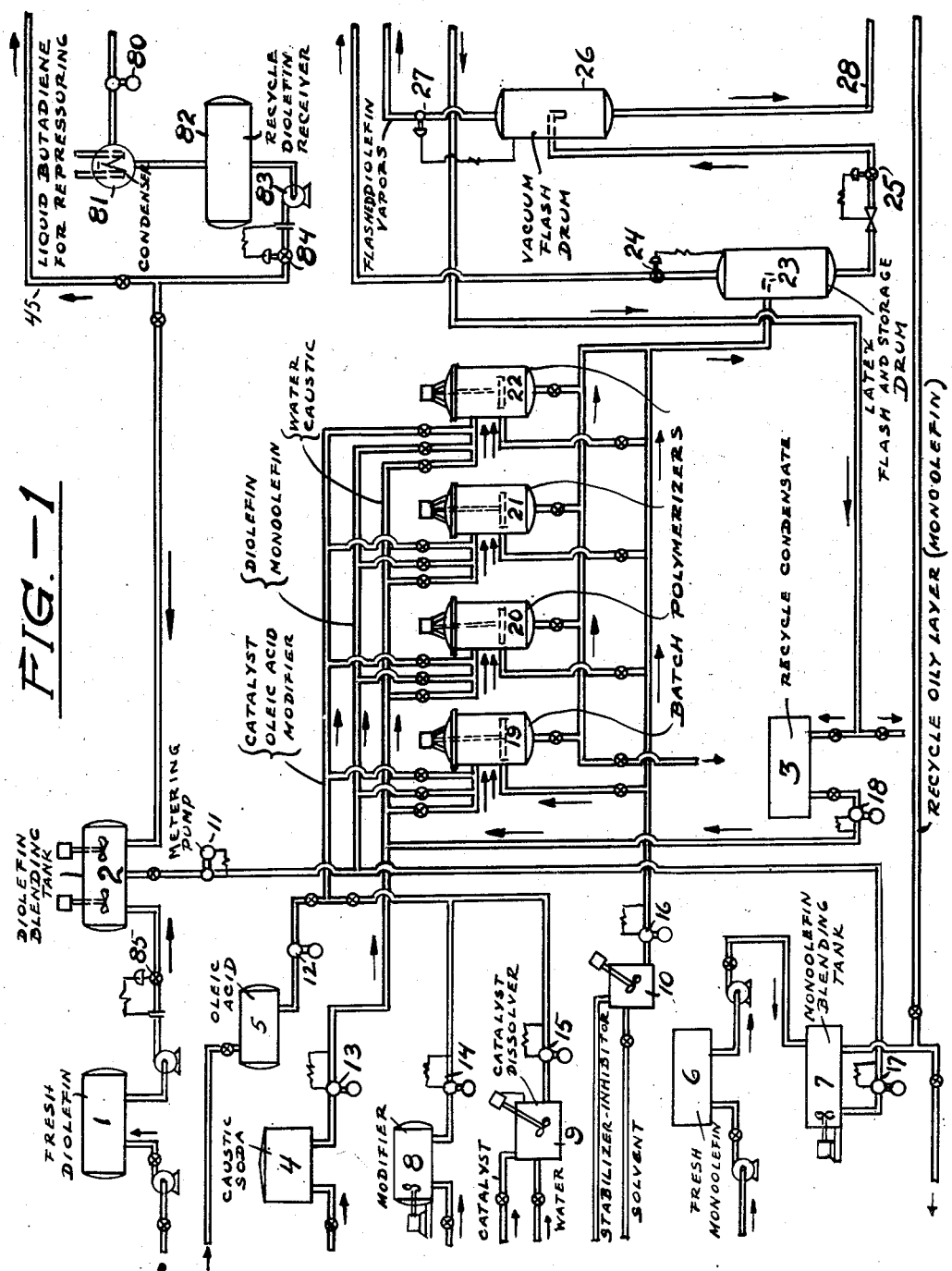

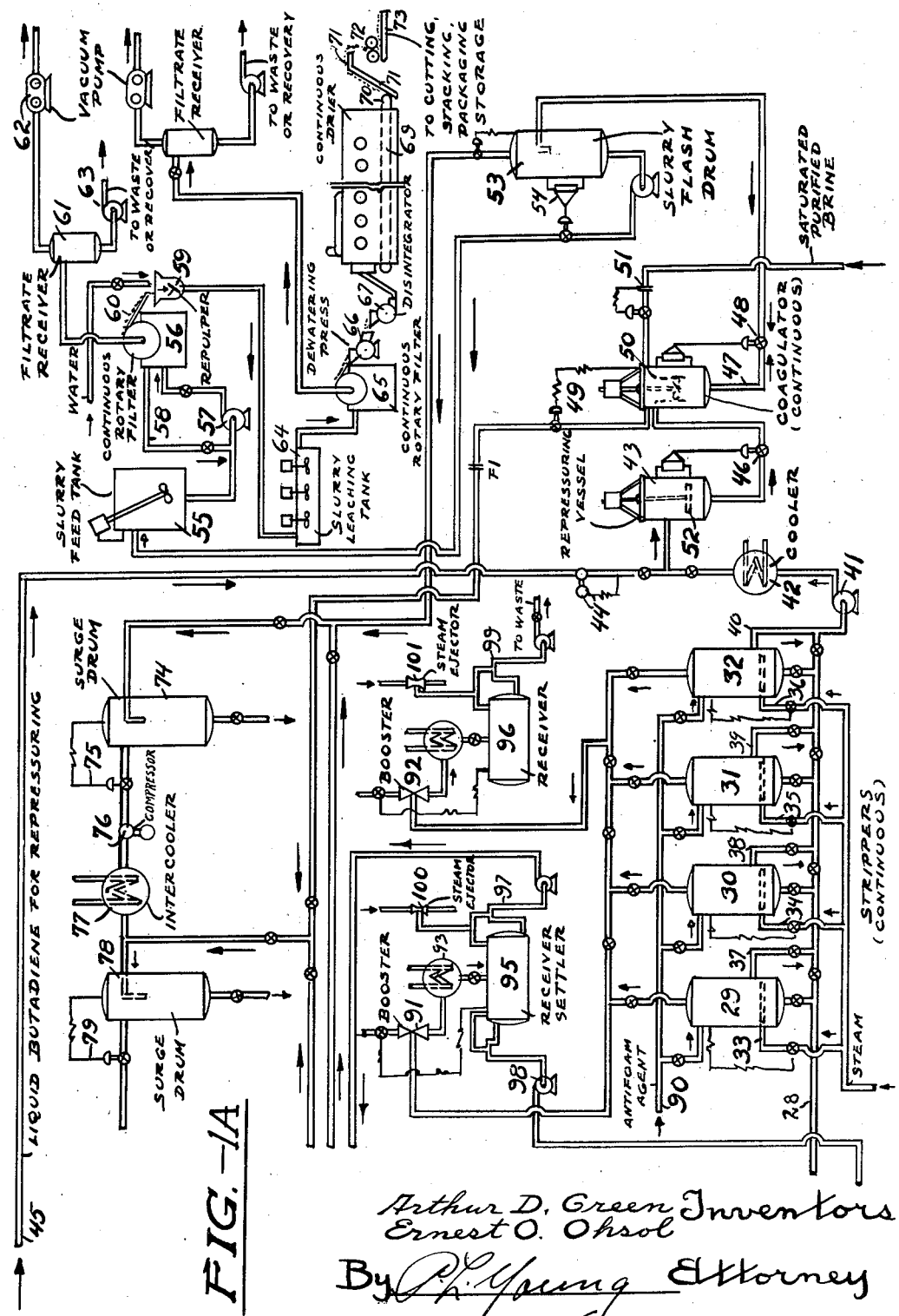

2,556,851

UNITED STATES PATENT OFFICE 2,556,851

USE OF RECYCLE AQUEOUS ACRYLONITRILE CONDENSATE IN BUTADIENE-1,3 EMULSION POLYMERIZATION

Ernest O. Ohsol and Arthur Donald Green, Cranford, N. J., assignors to Standard Oil Development Company, a corporation of Delaware Application September 10, 1948, Serial No. 48,778

2 Claims. (Cl. 260—82.3)

This application is a continuation-in-part of an earlier application Serial No. 470,776, filed December 31, 1942, now abandoned.

The present invention pertains to the production and finishing of emulsion polymerizates and particularly to a method and apparatus for finshing such polymerizates in a continuous manner.

It is an object of this invention to provide the art with a method and apparatus whereby a water slurry of synthetic rubber-like emulsion polymerizate can be produced continuously in a novel and highly advantageous and expeditious manner.

In view of the current shortage of natural rubber, it is essential to devise methods whereby synthetic rubber-like emulsion polymerizates, particularly of the Buna S and Perbunan types may be made in large volume and with uniform properties. Continuous operation is particularly suited to reach these objectives since smaller equipment, less supervision, and a more uniform product are obtainable thereby than in batch operation.

An apparatus suitable for the conduct of the process of the present invention is shown diagrammatically in the accompanying drawing.

In the drawing 1 is a storage tank for fresh diolefin, from which fresh diolefin is pumped into blending tank 2 and is mixed with recovered diolefin. Recycled condensate (essentially distilled water, with some dissolved ethylenic monomer such as styrene or acrylonitrile) is stored in tank 3, while tank 6 holds fresh monoolefinic or ethylenic monomer, which is run into tank 7 where it is blended with some recovered and recycled monoolefin. Tank 9 is a catalyst dissolving tank in which a solution of catalyst is made up, for example, a solution of potassium or ammonium persulfate in water. Tank 8 is a tank in which a supply of liquid polymerization modifying agent, such as "Lorol" mercaptan (a mixture of aliphatic mercaptans prepared from "Lorol" alcohol (Du Pont) which contains approximately 55 percent of $C_{12}$, 30 percent of $C_{14}$ and 15 percent of $C_{16}$ alcohols), is kept at a uniform composition. A supply of caustic soda solution is kept in tank 4 and a supply of oleic acid is stored in heated tank 5. All of the blending and dissolving tanks are provided with suitable stirring means. A solution or emulsion of inhibitor is made up in tank 10. In the process to be described, two types of inhibitors are required, one a polymerization inhibitor to serve as an emergency short-stop for the reaction step in case a reactor should "run away" and for addition to the latex just prior to stripping to prevent polymerization during stripping; the other a storage stabilizer to give the finished rubber oxidation resistance and storage stability. It is possible to combine both functions in one inhibitor, for example, by the use of phenyl-beta-naphthylamine in the manufacture of Perbunan. This may be suitably made up as a stable dispersion by grinding the powder in a ball mill with a soap and water, or as a solution in a suitable solvent such as benzene, or as a true emulsion of, for example, a benzene solution in water.

The various raw materials are added to each batch reactor by a suitable means, such as utomtic cut-off metering pumps 11, 12, 13, 14, 15, 16, 17 and 18, each set to deliver the proper amount of each material to any reactor. The order of addition of reactants may be varied; for example, the water may be added first, then the caustic soda, then the oleic acid (or other fatty acid or other emulsifying agent component) simultaneously with the ethylenic monomer or monoolefin (acrylonitrile or styrene or the like), then the catalyst, then the promoter, and finally the diolefin (butadiene or isoprene or the like). Usually it is desirable to add only part of the modifier at first and add the rest at intervals during the reaction. At times the catalyst may also be advantageously added in a portionwise manner. Another method of addition could be to add the monoolefin first, then the promoter, then the oleic acid, then the caustic and water, then the diolefin, and finally the catalyst.

The enclosed polymerizers or reactors 19, 20, 21 and 22 are provided with an efficient type of stirrer suitable for establishing and maintaining an emulsion in the vessel. A turbine type of agitator may be used, for example. It is often advantageous to run the agitator at a high speed at the beginning of a polymerization run during the setting up of the emulsion, followed by a reduction in speed during the balance of the run, both to save power and to prevent breaking the emulsion as the reactants polymerize to more solid particles. A batch polymerization run will generally last from 6 to 24 hours, depending upon the materials polymerized, the type and amount of catalyst and promoter and the temperature. For example, it has been found advantageous in the manufacture of butadiene-nitrile rubber to operate with the reactors at 35° C. for the first hour or two and at 40° C. until the completion of the run, which takes about twelve hours more. The monomers are usually copolymerized in the emulsion reaction in approximately the same proportions in which they are present in the feed, though in the case of butadiene-acrylonitrile copolymers the product may be slightly richer in average acrylonitrile content than the feed; and the conversion obtained will be from 55 to 95 percent, usually around 65 to 75 percent. The polymerization equipment is preferably corrosion resistant, either stainless steel (at least as the lining) or glass, in order to avoid inhibition or misguidance of the reaction. Temperature control is usually obtained by suitable jacketing.

It is not necessary that the polymerization be carried out as a batch reaction since it has been found possible to conduct the polymerization continuously with the reactant emulsion flowing through several reactors in series similar to those shown in the drawing for batch polymerization. A pre-emulsifier may be used ahead of the series of continuous polymerizers. Continuous polymerization offers some simplification in scheduling of operations and possibly a saving in labor, although in most cases it is somewhat easier to obtain better control of product quality and utilization of reactants in batch polymerization.

As mentioned previously, the rate of reaction is controlled by the catalytic ingredients and by the temperature. The exothermic heat of reaction is removed by cooling water usually circulated through the reactor jackets (after the preliminary warming-up period). The temperature in the reactors is maintained by raising or lowering the amount or temperature of cooling water circulated. If the reaction should for some unusual reason tend to increase its velocity so that the heat of reaction raises the temperature of the reactor faster than heat can be removed by the available cooling facilities, the rate of reaction will build up and may become violent. In such a case the inhibitor should be introduced into the reactor through the lines 86, 87, 88 and 89 provided therefor.

After a batch is considered to have reached its optimum conversion level (determined by taking small latex samples and testing them) the contents of a reactor are released through the bottom and allowed to flow into latex flash drum 23. Due to the incomplete conversion in the reactor, there will be a considerable amount of unreacted volatile hydrocarbon (such as butadiene or isoprene) in the reactor, exerting a considerable vapor pressure ordinarily in the neighborhood of 20 to 70 pounds per square inch gauge. In the system shown in the drawing the latex is forced to the flash drum by this pressure, the pressure in the flash drum being maintained at an appreciably lower level by releasing vapors through release valve 24 to the suction of a diolefin recovery compression system. It is convenient, especially in cases where butadiene is the principal volatile material, to maintain the pressure in drum 23 at around atmospheric pressure, or slightly above, e. g., at 0 to 5 pounds per square inch gauge. The release valve 24 may very advantageously be an automatic back-pressure release valve. At the same time as each batch is discharged into flash drum 23 a quantity of inhibitor sufficient to stop polymerization is preferably added either to the flash drum or advantageously to the latex line. This may be the same as the reaction short-stop inhibitor. It may be desirable to have an agitator in flash drum 23. In general, the flash drum should have sufficient storage capacity to hold more than one batch, so that it may be fed discontinuously from batch reactors while feeding latex to the finishing system continuously. It is further advantageous to provide a fair amount of latex holding capacity to level out variations from batch to batch and yield a more uniform finished product and also to reduce to a minimum, variations in the liquid level in the flash drum and consequently minimizing variations in the hydrostatic head on the outlet from the flash drum. It is further advantageous to provide a suitable vessel (not shown in drawing) for holding and gradually blending off any off-test latex.

From flash drum 23 the latex flows under its own pressure to vacuum flash drum 26, wherein a low pressure such as 1 to 2 pounds per square inch absolute is maintained by pulling off vapors through valve 27 to the suction of a recovery compressor or other suitable means. Valve 27 may also advantageously be an automatic back pressure release valve. The rate of latex flow is controlled at a steady value, corresponding to the average rate of production of polymer, by valve 25 which may very advantageously be an automatic flow controller, wherein a control valve of suitable streamlined non-plugging design (available commercially) is actuated by the pressure drop across an orifice or preferably across a Venturi meter shown in the line for discharging latex from flash drum 23. In both flash drums the latex remains still essentially at its polymerization temperature or may be up to ten degrees below that temperature.

The use of two successive flash drums or tanks in series is particularly necessary in the production of butadiene-acrylonitrile copolymers and is predicated upon the following facts. Substantially complete recovery of monomers from the latex product is important for obvious reasons of economy, as well as industrial safety since the monomers are fairly explosive or toxic or both, and particularly acrylonitrile is rather malodorous. Vacuum flashing of butadiene is essential or at least highly desirable because the ratio of volatilities of the two monomers is greatest at low pressures so that the lower the pressure, the less nitrile is vaporized in the exhaustive butadiene flashing step and therefore the less opportunity for the relatively reactive nitrile to foul up the butadiene recycle system. Conversely, an incomplete flashing of butadiene at this stage would result in a loss of residual butadiene in the subsequent nitrile stripping step since there the stripped vapors are condensed at or below atmospheric pressure.

Vacuum flashing being desirable for the aforementioned reason of selectivity, it is highly advantageous to use at least two successive flash tanks in series, the first one serving to flash off unpolymerized monomers at relatively moderate temperatures to approximately atmospheric pressure, thereby allowing ready withdrawal of latex to storage at this point which is desirable to make the process as flexible as possible; the second flash tank serves to complete the butadiene stripping operation to the required extent at sub-atmospheric conditions also at relatively moderate temperatures. In addition to the flexibility feature just mentioned, this two-stage arrangement also offers a very significant economic advantage since less compression work is subsequently required in the recycle. This saving of work is not only that which is always realized by the usual practice of using multistage compression whenever the compression ratio exceeds the conventional limit, but further work is saved in the present process since the total amount of gas requiring re-compression on the compression side of the re-cycle is actually smaller because the gas withdrawn at atmospheric pressure from the first flash-off stage can be fed into the atmospheric interstage of the compressor for re-compression to the final pressure prevailing in the reactor, while only the gas from the second flash-off stage requires re-compression all the way from the ultimate sub-atmospheric flashing pressure of about 1 to 2 pounds per square inch absolute back to the pressure of about 20 to 70 pounds per square inch gauge prevailing in the reactor.

On the other hand, where isoprene or other less volatile diolefins are used, e. g., in the production of copolymerized isoprene-styrene rubbers or resins, good recovery and smooth operation can be obtained by one flashing stage followed by a steam stripping operation. In this case the isoprene not recovered by flashing will come over and largely condense with the styrene in the stripping step. Furthermore, especially in the production of the resins prepared from a major proportion of styrene and minor proportion of isoprene the conversions are usually so high that the monomer recovery is a far less important problem, especially from the economic view point.

Referring again to the drawing, the latex upon leaving the second flash drum 26 enters a plurality of strippers 29, 30, 31, 32, flowing through them continuously in series, while steam is introduced into each through lines 33, 34, 35, 36. In the drawing the latex flows by gravity from each vessel to the next, the vessels all being maintained under the same pressure. The rate of steam admission to each is suitably controlled, for example, by an automatic valve actuated by the pressure in each stripper and operating to hold a steady pressure within narrow limits, or actuated by a flow measuring device to provide a steady rate of steam flow. The temperature in the stripping zones is maintained below about 60° C. to prevent deterioration of the polymer.

An antifoam agent from line 90 is added in small amounts to each stripper. The details of the principles governing the number, size, shape, etc. of the strippers are disclosed in copending application of A. D. Green, U. S. Serial No. 467,931, filed December 5, 1942, now U. S. Patent 2,451,332. Instead of a series of individual vessels, continuous stripping may be accomplished in a plate-type column designed to provide proper conditions for holdup time, foam elimination and avoidance of plugging, as set forth in the copending U. S. patent of Ohsol and Waterman, No. 2,433,060. Instead of introducing steam into each stripping stage, in another modification essentially equivalent to the aforementioned stripping column it is advantageous in certain cases to concentrate the recovered monoolefin (e. g. acrylonitrile) in stripping by introducing steam only into the last stages and using the vapors from each stage as a stripping agent for the next preceding stage, and the latex being pumped from the pressures in each stage increasing successively one stage to the next. It may be advantageous for purposes of better level control to pump from each stage in any case.

The vapors from the strippers pass to one or more steam boosters 91, 92, to permit operation of the strippers at a lower pressure (and hence a low temperature) than the condensing temperature of the stripped vapors. This condition is encountered whenever there is a temperature limitation in stripping the latex (diolefin-acrylonitrile and to a slightly lesser extent diolefin-styrene latices will deteriorate upon appreciable exposure to high temperatures—particularly in presence of inorganic salts) and whenever the vapor pressure of the stripped vapors is relatively high, so that they will not condense under the necessary stripping pressure at ordinary cooling water temperature. For example, the strippers may be maintained at 75–200 mm. Hg absolute pressure and the condensers at 350 mm. absolute. The boosters discharge a mixture of steam and stripping vapors into condensers 93, 94, wherein essentially all the water and most of the organic vapors condense and run into receivers 95 and 96. The residual vapors are removed by steam ejectors 100 and 101 if the condensation is conducted under vacuum. Of course, mechanical vapor compression by compressors, vacuum pumps, or blowers may be used instead of steam boosters and ejectors.

The receivers are large enough to permit the condensate to settle out any organic layer particularly when a relatively water-insoluble monomer such as styrene is used, which may be continuously drawn off and recovered as at 98 to be recycled to the polymerizers. The aqueous layer is then preferably recycled to be used as water for making up the emulsion in the polymerizers. This feature is particularly important and unexpectedly advantageous when a material of considerable solubility such as acrylonitrile is stripped in which case there may be no oily layer at all, it being dissolved in the water as a solution containing up to about 8 per cent or usually 1 to 6 per cent of acrylonitrile.

The novel step of recycling this dilute nitrile solution is particularly advantageous since it allows substantially complete recovery of the valuable unreacted acrylonitrile in a manner not previously thought of. Relatively exhaustive stripping of nitrile from the latex is essential not primarily for purposes of recovery but rather because even small amounts of free nitrile are intolerable in the latex during subsequent processing operations and even less tolerable in the finished product in view of the great toxicity and bad odor of the nitrile monomer. Steam stripping is the most convenient and effective mode of removing nitrile from the latex. However, in view of the completeness of the stripping operation required to reduce the nitrile content of the latex below the toxic tolerance, a very large volume of dilute nitrile solution is obtained from which the recovery of nitrile by conventional concentration, extraction or fractionation methods were found to be uneconomical and therefore previously this nitrile solution used to be discarded.

It has now been discovered that all or at least part of this dilute nitrile solution can be recycled as such to the emulsification or polymerization zone and actually serve as the aqueous polymerization medium. Thereby a double advantage is obtained: in the first place, essentially complete nitrile recovery is made possible and secondly, a large amount of steam generation is saved in that the steam used in the stripping step, after condensation in the form of the nitrile solution, is used as the polymerization medium where otherwise it has been usually necessary to emulsify the reactive monomers in distilled water or steam condensate obtained from a separate source solely for the purpose of serving as the emulsification medium.

Furthermore, where the desired degree of stripping requires so much steam that, especially when added to the booster steam, there will be more nitrile-containing aqueous condensate than can be utilized in the process, only the condensate from the first one or two strippers can be recycled and the rest discarded. This is the principal purpose of having two or more strippers and condenser-receivers, so that the richer material from the first stripper or strippers, which material contains about 70 percent or more of the nitrile monomer originally present in the polymerized latex, can be kept separate and recovered by recycling whereas the extremely dilute surplus condensates from the subsequent stripping stages can be discarded with only a relatively negligible loss of monomer. In the drawing the two condensation systems are manifolded so that the first one, two or three strippers can feed the recycle system and the rest can run to waste.

In a case where appreciable monomer would be lost by this waste stream, the countercurrent flow of vapors as mentioned above has its advantages, in that there is a higher concentration of nitrile in the first stages of the stripping system and a lower concentration in the last stages. The boosters are preferably controlled (control valve on steam to booster) to maintain a fixed pressure differential between stripper and condenser, or the one being fixed, to hold a steady pressure in the other. It may be preferable, when better control of pressures is desired, to have a separate booster for each stripper.

The latex leaving the strippers is pumped through cooler 42 into a repressuring vessel 43 provided with an efficient agitator 52 such as a turbine mixer or a propeller. One to five percent of a repressuring liquid, e. g., a non-acetlyenic hydrocarbon having up to 5, preferably 3 to 5 carbon atoms, such as butadiene (which may be conveniently withdrawn from the butadiene recycle stream) propane, propylene, normal and branched chain butylene, amylene, isoprene or a non-hydrocarbon substance such as ethyl chloride, is fed through proportioning pump 44 (or other suitable means of feed such as automatic displacement meter or automatic throttling valve actuated by rate of flow) and is admixed with the latex entering the repressuring vessel. The latex is precooled in order to prevent deterioration of its physical properties upon addition of coagulating brine, and to facilitate solution of the repressuring agent in the latex. The purpose and manner of carrying out the repressuring of latex is described in the copending U. S. patent of W. W. Waterman and B. M. Vanderbilt, No. 2,393,348. The repressuring agent causes certain types of latices such as Perbunan latex to precipitate in the form of relatively small, non-sticky particles upon addition of coagulating agent. Buna-S latex is relatively unaffected by this procedure and particle size and stickiness during coagulation may be controlled by addition of a suitable divalent metallic salt during or immediately after coagulation. In the coagulation of latices of modified styrene resins, repressuring may also be dispensed with, as disclosed in application of Waterman and Parker, U. S. Seral No. 455,730, filed August 22, 1942, now U. S. Patent 2,393,208, by controlling the temperature and concentration of the latex before coagulation.

The repressured latex leaves repressuring drum 43 through valve 46, the opening of which may advantageously be automatically controlled to maintain a proper level in drum 43. This valve should be of the free opening, non-plugging type.

The latex thereupon enters continuous coagulator 47, provided with means for insuring a high degree of agitation at the point where the latex and brine come into contact. It has been found that a propeller type agitator surrounded by a coaxial draft tube performs this function very efficiently and produces a slurry of coagulated rubber in brine of a uniform and not too large particle size. The propeller diameter should be about 75 to 90 percent of the draft tube diameter, and the speed of revolution, pitch, and diameter of the propeller should be such that the slurry flowing through the draft tube will have a high degree of turbulence (high Reynolds number = Diameter of tube × mass velocity/viscosity). The pressure in the coagulator in Perbunan operation is maintained at the value required to insure formation of coagulated particles of the desired size and degree of tack. In general, the higher the pressure, the finer and the less tacky the particles. Ordinarily the pressure kept is in the neighborhood of 5-15 pounds per square inch gauge.

A very convenient means of controlling this pressure is to add a slight excess of repressuring agent in drum 43 and release this excess through valve 49 on the coagulator. Valve 49 is conveniently an automatic back pressure regulator, and F1 is a rate of flow indicator by which the rate of excess gas release may be checked to form a basis for setting the rate of supply of repressuring liquid by pump 44. The brine is supplied to the coagulator through automatic flow control valve 51, set to correspond to the rate of latex admission by valve 25. The latex and brine are both admitted preferably directly into the draft tube. The volume ratio of brine inlet flow to latex inlet flow will ordinarily be from 0.5 to 1.5, depending upon the emulsifying agent, amount of repressuring agent used, etc. The brine used may be ordinary salt brine, preferably purified in accordance with the copending application U. S. Serial No. 409,871, filed September 6, 1941, by B. M. Vanderbilt, and now abandoned. The holding time in the coagulator need not be long, one or two minutes being ample with sufficient agitation.

The slurry leaves the coagulator through a level control valve 48 or, if desired, an overflow might be used instead, with the following flash drum located at an elevated position. The level control valve should be of the free opening, streamlined type. The slurry flashes off the remaining repressuring agent in slurry flash drum 53, the vapors passing through an automatic back pressure control valve to the surge drum 74 for the first compression stage, if the repressuring agent is the same as the recovered diolefin. Otherwise a separate recovery system may be used or the material could be discarded. A small amount of steam may be injected into the slurry in 53 if desired, to aid in removing the last traces of volatile material. The slurry is pumped from drum 53 at a rate controlled if desired, by a level controller such as 54 (non-clogging type) and fed to slurry tank 55.

It is convenient to have the slurry tank 55 of a fairly large size to afford another opportunity for blending the coagulate to ensure uniformity. Also the tank should have sufficient capacity to ensure continuity of operation during minor shutdowns of rotary filter 56, which is fed from 55 via pump 57. Constant level in the filter box 56 is maintained with the aid of overflow return line 58. The rotary vacuum filter picks up a cake of coagulated rubber 60, the dewatering of which may be aided by one or more press rolls, and a spray may also be provided to aid in washing away the salt. The cake falls into repulper 59 wherein it is broken up and resuspended in water. The filtrate and air sucked in by the filter passes to filtrate receiver 61, wherein the filtrate (salt solution) separates and is removed by pump 63, to be either discarded or recycled to the coagulation step. The air in 61 is removed by vacuum pump 62. The resuspended slurry is passed through leaching tank 64 provided with suitable agitation equipment to maintain the slurry, to allow time for solution of the emulsifying agent adsorbed on the slurry particles (as disclosed in U. S. application Serial No. 413,582, filed October 4, 1941, by Waterman and Ohsol, and now abandoned). A small amount of acid may be added to 64 as desired.

The slurry from 64 overflows into a second continuous rotary filter 65, which may be essentially a duplicate of 56. The cake leaving 65, if still quite moist (say 50-60 percent water) may be subjected to squeezing, further rolling or extrusion to remove mechanically as much water as is convenient (say cutting water content down to 20-30 percent) before drying, in order to reduce the size of the necessary drier and avoid the necessity for unduly long drying times which would tend to cause case-hardening of particles in the drier, leaving the interiors moist, or softening of the particles so that the screen conveyor in the dryer would soon become plugged. Usually the pressing operation causes formation of a cake with more or less tendency to hold together, and hence a means 67 may be provided for breaking it up into uniformly-sized pieces of dimension conducive to rapid drying and not too great resistance to air flow in the drier, such as pieces $\frac{1}{4}''$ to $1''$ square and $\frac{1}{16}$ to $\frac{1}{4}''$ thick. 67 may be a picker or a rotary cutter or a hammermill, or the like.

The continuous drier 69 shown in the drawing has a travelling screen or perforated plate on which a uniform bed of $\frac{3}{4}$ to 3 inches of material is loaded through which hot air is circulated by fans, heat being supplied by steam coils. The air temperature is regulated to give as rapid drying as possible without unduly softening or injuring the properties of the polymer. In the feed end of the drier, temperatures may be maintained higher than at the discharge end, for the stock temperature tends to assume the wet bulb temperature of the air which is considerably lower than the dry bulb temperature. In general the maximum stock temperature should be below about 300° F. The dried crumbs of rubber (they may be partially stuck together in a loose blanket) are discharged at 70, taken by conveyor 71 to a rubber mill 72 which forms the crumbs into a relatively smooth sheet which is then conveyed by 73 to cutting, stacking and packaging facilities.

An alternate means of finishing the wet filter cake would be to put it through heavy squeeze rolls to form a sheet, and then dry the sheet in an impingement type of continuous drier. In order to form a wet sheet, it may be necessary to sandwich the rubber between screens in passing it through the rolls. It is desirable in such a case slightly to acidify the leaching tank water.

The diolefin recovery and compression system comprises two compressors, 76 and 80, and intercooler 77, surge drums 74 and 78 before each compressor, an aftercooler and a condenser 81 (the two may be separate or combined as one heat exchanger) and a condensed diolefin receiver 82. The system illustrated refers particularly to butadiene recovery, as it would be more desirable to recover isoprene with just one compression stage. Two stages are used in order to get a high degree of recovery by going to a fairly high vacuum (1-2 pounds per square inch absolute) although equipment could be saved at the expense of material recovery and power by using only one stage for butadiene. The pressure leaving the second stage will be about 45 to 80 pounds gauge with ordinary cooling water in condenser 81. The recovered diolefin accumulating in receiver 82 is pumped by 83 through flow controller 84 into blending tank 2 wherein a uniform composition of diolefin fed to the polymerization system is established. It is often necessary or desirable to provide for distillation of the diolefin, either to remove inhibitor or polymer from freshly received diolefin, or to purify recycle diolefin, since any impurities in the feed diolefin will tend to build up in the system until the concentration thereof in the diolefin lost, multiplied by the amount lost, equals the amount introduced in the fresh feed. Similarly, when styrene is used, it may be necessary to vacuum distill or extract with caustic solution the as-received styrene to remove inhibitors placed therein to protect it from polymerization during transport and storage.

The present invention is particularly adapted for use in the production and finishing of emulsion copolymerizates of about 30 to 90 or preferably 60 to 80 parts of a conjugated diolefin having 4 to 6 carbon atoms such as butadiene, isoprene, piperylene or dimethyl butadiene with 70 to 10 or preferably 40 to 20 parts of a compound containing a single C=C linkage and capable of forming copolymers with said diolefin. Preferred compounds containing a single C=C linkage include styrene and substituted styrenes such as alpha methyl styrene and the like, acrylic nitriles of 3 to 4 carbon atoms such as acrylonitrile, methacrylonitrile, or chloroacrylonitrile, acrylic and methacrylic acid esters and unsaturated ketones such as methyl vinyl ketone and the like.

The polymerization reaction mixture is generally prepared by agitating the calculated amount of polymerizable materials in about an equal to fourfold, or preferably double the quantity of water or preferably recycled, aqueous comonomer solution, making due allowance for the amount of comonomer present in the recycled solution, using soap or other suitable surface active material as the emulsifying agent. The polymerization is usually effected at temperatures between about 0 to 60° C., or preferably between 10 and about 50° C. and in the presence of a suitable polymerization catalyst which is capable of liberating oxygen under the polymerization conditions. Such catalysts include hydrogen peroxide, alkali metal and ammonium persulfates or perborates or benzoyl peroxide or the like. It is also desirable to include a suitable modifier such as an alphatic mercaptan of about 8–16 carbon atoms or certain halogen compounds such as carbon tetrachloride or alpha chloroacrylonitrile in order to control the polymerization and in general to obtain a more plastic product.

The polymerization is conducted under a pressure sufficient to keep the most volatile component of the polymerization mixture in the liquid phase. The polymerization is continued until about 50–95 percent of a solid polymer, based upon the liquid monomers used is obtained. Upon completion of the polymerization a suitable stabilizing agent such as hydroquinone or phenyl-beta-naphthylamine is added. The stabilized latex in the storage drum is advantageously maintained at a pressure slightly above atmospheric. Alternatively, the latex could be stored after stripping.

The latex, after being stripped of unpolymerized mono-olefinic material, may in the case of acrylonitrile copolymerizates advantageously be cooled to about 35° C. prior to repressuring and the coagulation is subsequently effected at a temperature of about 30–35° C.

The following examples are illustrative of the present invention but the invention is by no means limited thereto.

Example 1.—Buna S

A five-stage continuous polymerization system of five reactors in series is fed with the following three streams:

| Stream No. | Component | Parts by Weight |
|---|---|---|
| 1 | Water | 180 |
|   | "Ivory" Soap | 5 |
|   | "Lorol" Mercaptan | 0.167 |
| 2 | Butadiene | 75 |
|   | Styrene | 25 |
| 3 | Condensate | 20 |
|   | Potassium Persulfate | 0.3 |

The first two streams are fed into a pre-emulsifier equipped with a turbine type agitator and thence into the first of the series of polymerizers. The catalyst stream 3 is added to the first polymerizer. Additional streams of 0.167 part by weight of mercaptan per unit of time corresponding to the above quantities of the other reagents are added after the second and third stages. The first reaction stage is maintained at 105° F., the second, and the third at 113° F., and the last two stages at 122° F. A conversion of about 62 percent is obtained with a nominal holdup time of the system of about 22 hours. The latex leaving the last stage is mixed with an emulsion of phenyl-beta-naphthylamine in soap water to the extent of providing 2 percent of the naphthylamine on the product. The latex is flashed to 5 pounds gauge pressure in the latex flash drum, having a holding time of about 36 hours. The latex is next flashed to 2 pounds per square inch absolute in the vacuum flash drum, from which it passes to a series of four strippers maintained at 150 mm. mercury absolute pressure by a common steam jet evactor and barometric condenser, the stripped vapors being passed through a condenser before entering the evactor. (In this case no booster is necessary.) 0.2 percent (base dry polymer) of lanolin is added to the latex as a foam preventive. The stripper temperature will vary from 132° F. in the first stage where considerable styrene is present to 140° F. in the last stage where water is the principal volatile material present. About 10 pounds of steam are injected per pound of styrene removed, and the total nominal holding time in the strippers is about 6 hours. The latex passes from the strippers through a cooler where it is cooled to 110° F. or less, and is fed into the draft tube of a continuous coagulator. Two volumes of 12 percent brine per volume of latex are also fed into the coagulator, from which the slurry passes to the slurry feed tank 55. One-half percent of zinc sulfate (based on the rubber) as a 5 percent water solution is added to the slurry entering the slurry tank. The slurry is filtered, yielding a cake containing 50 percent moisture on the wet basis, which is repulped with water to form a 15 percent slurry. The slurry is allowed to soak in the leaching tanks, filtered again to a 50 percent moisture content cake, pressed down to 20 percent moisture, put through a picker, and continuously dried at about 200° F. for not over one hour residence time. The dried blanket is sheeted, cut, and packaged.

Example 2.—Perbunan

A batch polymerization system is supplied with the following reactants:

| Component: | Parts by weight |
|---|---|
| Water | 200 |
| Butadiene | 75 |
| Acrylonitrile | 25 |
| Sodium oleate (as equivalent sodium hydroxide and oleic acid) | 5 |
| Ammonium persulfate | 0.25 |
| Lorol mercaptan | 0.50 |

A reactor is charged with the above reactants, first with water, then with sodium hydroxide, then with oleic acid to form a sodium oleate solution of about 8.5 pH. The acrylonitrile and mercaptan are then added, the agitation being turned on full, followed by the butadiene and the persulfate. The reaction is allowed to proceed at about 40° C. for about 12 hours (to about 75 percent conversion). The latex as it is discharged from the reactor is admixed with an emulsion of a benzene solution of phenyl-beta-naphthylamine in water to the extent of two parts of naphthylamine per hundred parts of polymer. The reactor batches are preferably staggered so that batches are discharged into the latex flash drum at fairly uniform intervals of time. The flashing operations are conducted in the same way as in Example 1.

The strippers are run at an absolute pressure of about 100 mm. of mercury, with the corresponding stripping temperature varying from 118° F. to 125° F. as the acrylonitrile is removed. A booster is provided for each stage, increasing the pressure to 350 mm. The vapors from the first three stages are recycled to the reaction step as water for the emulsion, the amount of dissolved nitrile therein being subtracted from the fresh nitrile to be added in each batch. The condensate from the last stage is discarded. It will be found that usually all the stripped nitrile is dissolved in the recycle condensate. The latex leaving the strippers is cooled to 100–110° F. and repressured with butadiene to 5–10 pounds gauge, coagulated at 3–8 pounds per guage with 0.8 volumes of brine at a pH of about 8.3. $CO_2$ may be injected into the coagulator if necessary. The slurry of coagulated latex is flashed and filtered, washed, etc., as in Example 1.

*Example 3.—Modified styrene resin*

[Charge—per 1000 gallons of reactor capacity]

|  | Pounds | Gallons |
|---|---|---|
| Isoprene (distilled) | [1]827 | 146 |
| Styrene (distilled) | 1735 | 233 |
| Carbon disulfide | 91 | 9 |
| Oleic acid | 118 | |
| Caustic soda | 16 | |
| Potassium persulfate | 8 | 61 |
| Water (condensate) | 4930 | |

[1] 80-90% pure.

The reaction mixture is prepared in the same way as in the case of Perbunan, the isoprene corresponding to the butadiene, the styrene to the acrylonitrile and the carbon disulfide to the mercaptan.

The batch is allowed to react for about 14 hours at 140° F. to give a conversion of about 90 percent. The batch is flashed to about one atmosphere and stripped (the vacuum flashing step being omitted). The latex is stripped in three stages using about 10 pounds of steam per pound of unreacted styrene in the mixture at a pressure of 100–150 mm. mercury absolute. As an antifoam agent, 0.15 percent of candelilla wax dissolved in a heavy, white, paraffin oil is added. No booster is used. The latex is cooled to 125° F., diluted with an equal volume of water and coagulated continuously with an equal volume (basis diluted latex) of 12–15 percent sodium chloride brine. No repressuring is carried out. The slurry of coagulated latex is passed directly to the slurry storage tank and may be further treated as indicated in previous examples for producing ordinary grades of resin, or washed with special solvents for certain uses.

The foregoing description is intended to be illustrative. It is to be understood that many variations are possible thereunder which are well within the purview of the following claims.

We claim:

1. In a process in which 30 to 90 parts of butadiene-1,3 monomer and 70 to 10 parts of acrylonitrile monomer are polymerized in a polymerization zone in aqueous emulsion in the presence of an oxygen yielding catalyst and in which unreacted monomers are stripped in a stripping zone from the resulting latex of rubbery polymer, including a step of steam stripping unreacted acrylonitrile from the latex, the improvement which consists in condensing the stripped vapors which contain acrylonitrile and recycling the resulting aqueous condensate to the polymerization zone in lieu of fresh water otherwise required for the emulsification of the monomers, the said aqueous condensate containing 1 to 8% of dissolved acrylonitrile.

2. In a process wherein 60 to 80 parts of butadiene-1,3 monomer and 40 to 20 parts of arcylonitrile monomer are polymerized in a polymerization zone in the presence of an oxygen yielding catalyst at a temperature between 10° C. and 60° C. and at a pressure of about 20 to 70 lbs. per sq. inch in aqueous emulsion containing 1 to 4 volumes of aqueous liquid per volume of monomers and wherein unreacted butadiene is flashed off from the resulting latex in a flashing zone maintained at a pressure below 5 lbs. per sq. inch and wherein the flashed latex is passed through a series of steam stripping zones, the improvement which consists in condensing the steam vapors which contain unreacted acrylonitrile stripped from the latex and recycling to the polymerization zone at least a portion of the resulting aqueous condensate which contains 1 to 6 weight percent of dissolved acrylonitrile, the aqueous nitrile condensate being fed to the polymerization zone in lieu of fresh water and fresh nitrile monomer otherwise required in the making up of the monomeric emulsion, the amount of acrylonitrile so recycled being equal to at least 70 weight percent of the total acrylonitrile stripped from the polymerized latex.

ERNEST O. OHSOL.
ARTHUR DONALD GREEN.

REFERENCES CITED

The following references are of record in the file of this patent:

UNITED STATES PATENTS

| Number | Name | Date |
|---|---|---|
| 2,259,180 | Schoenfeld | Oct. 14, 1941 |
| 2,393,348 | Waterman et al. | Jan. 22, 1946 |
| 2,433,060 | Ohsol et al. | Dec. 23, 1947 |
| 2,451,332 | Green | Oct. 12, 1948 |
| 2,455,714 | Waterman et al. | Dec. 7, 1948 |
| 2,462,013 | Waterman | Feb. 15, 1949 |

FOREIGN PATENTS

| Number | Country | Date |
|---|---|---|
| 304,207 | Great Britain | Apr. 15, 1930 |
| 364,089 | Great Britain | Dec. 21, 1931 |